US008024625B2

(12) United States Patent
Noguchi

(10) Patent No.: US 8,024,625 B2
(45) Date of Patent: Sep. 20, 2011

(54) NETWORK SYSTEM FOR DIAGNOSING OPERATIONAL ABNORMALITY OF NODES

(75) Inventor: Takuro Noguchi, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 601 days.

(21) Appl. No.: 12/175,974

(22) Filed: Jul. 18, 2008

(65) Prior Publication Data

US 2009/0252045 A1  Oct. 8, 2009

(30) Foreign Application Priority Data

Apr. 8, 2008 (JP) ................... 2008-100435

(51) Int. Cl.
 *G06F 11/00* (2006.01)
(52) U.S. Cl. .................................................. 714/704
(58) Field of Classification Search .................. 714/704, 714/708, 712, 713, 717
See application file for complete search history.

(56) References Cited

U.S. PATENT DOCUMENTS

| | | | | |
|---|---|---|---|---|
| 4,769,761 A * | 9/1988 | Downes et al. | ............... | 709/224 |
| 5,703,409 A * | 12/1997 | Fukumitsu et al. | ........... | 714/704 |
| 6,094,737 A * | 7/2000 | Fukasawa | ...................... | 714/738 |
| 6,098,179 A * | 8/2000 | Harter, Jr. | .......................... | 714/4 |
| 6,538,987 B1 * | 3/2003 | Cedrone et al. | ............... | 370/216 |
| 6,728,216 B1 * | 4/2004 | Sterner | ......................... | 370/252 |
| 7,308,619 B2 * | 12/2007 | Lee | ................................ | 714/704 |
| 7,586,953 B2 * | 9/2009 | Forest et al. | .................. | 370/503 |
| 7,792,059 B2 * | 9/2010 | Fonseca et al. | ............... | 370/255 |

FOREIGN PATENT DOCUMENTS

JP       2002-44101 A     2/2002

* cited by examiner

*Primary Examiner* — James C Kerveros
(74) *Attorney, Agent, or Firm* — Sughrue Mion, PLLC

(57) ABSTRACT

A network system for judging abnormality of a self node with high precision on the basis of information from other nodes connected to a network is provided. In each node, a frequency at which data frames to be transmitted/received among nodes cannot be received is counted every communication partner node by a reception time-out error count unit. After some node is reset and restored, a start-up signal is transmitted with an initial data frame by a start-up signal transmitting unit of the node concerned. In the other nodes receiving the start-up signal, a count result of the transmission destination node of the start-up signal by a reception time-out error count unit is returned by the monitoring result returning unit, and upon reception of the count result, the node which transmits the start-up signal makes a self-diagnosis by a self-diagnosing unit.

12 Claims, 9 Drawing Sheets

NETWORK SYSTEM FOR DIAGNOSING OPERATIONAL ABNORMALITY OF NODES

BACKGROUND OF THE INVENTION

1. Field of the Invention

The present invention relates to a network system transmits/receives data frame among nodes connected to a network according to a predetermined protocol, and mutually diagnosing operational abnormality of nodes.

2. Description of the Related Art

High functionality, high performance, high reliability, high safety and enhancement of comfort of vehicles have recently provided the setting for increase of the mount number of electrical components of a vehicle, and the amount of information to be transmitted/received among electrical parts mounted in a vehicle has rapidly increased. Therefore, for the purpose of reducing the number of wire harnesses for transmitting information, a multiplex communication system (CAN (Controller Area Network) or the like) has been mainly adopted.

In the multiplex communication system, control ECUs as nodes for transmitting/receiving data frames are connected to a common multiplex communication line to form a network, and data communication is performed through the multiplex communication line among the nodes. In the case of a vehicle having a wide variety of control types, in order to perform data communication efficiently, nodes are classified into plural node groups which are different in attribute of communication speed to form plural networks, and the communication between different networks is performed through a data relay device.

Each ECU is normally constructed so as to be reset by a watchdog timer, and CPU monitoring based on only a watchdog timer system in which CPU is reset to avoid operational abnormality caused by runaway of CPU when CPU runs away goes mainstream. Safe performance has recently leveled up more greatly, and there is developed a control device in which the operation of CPU is monitored by mounting a large-scale integrated circuit (LSI) or the like in ECU so that CPU can be also reset when CPU fails in operation or the like.

Furthermore, in connection with the level-up of the diagnosis function, means for storing, into a backup memory or a non-volatile memory, freeze frame data for storing an operation state such as the rotational speed of an engine, a vehicle speed, etc. when a failure judgment is settled, ECU calculation status data when an ECU calculation error occurs, etc., thereby making it easily to analyze a source of subsequent failure has been recently adopted as general control.

In the case of a vehicle in which control contents are particularly complicated and the number of nodes is large, it is not easy to specify a source of failure when the vehicle breaks down or goes wrong due to deterioration of ECU or the like. Furthermore, the reset of ECU described above occurs not only due to failure of ECU itself, but also due to variation of a power supply or the like. In order to discriminate the reset caused by node abnormality such as failure or the like and the reset caused by the variation of the power supply, for example, JP-A-2002-44101 (pages 5 to 10, FIG. 1) discloses a node diagnosis method and a node diagnosis system in which a relay device as one node among plural node groups different in the communication speed attribute diagnoses failure of nodes, and it is made easy to specify abnormal node.

However, these techniques described above have a problem that the cost of ECU increases because a large-scale integrated circuit (LSI) or the like is mounted in ECU and also with respect to CPU reset based on monitoring LSI, CPU itself cannot detect abnormality.

Furthermore, according the technique described in JP-A-2002-44101, the reset frequency of abnormality-occurrence target ECU is counted and compared with those of the other nodes, and node abnormality is judged only when the count value is an excessive count value. That is, the reset frequency of the judgment target node is relatively compared with the reset frequencies of the other nodes, and it is judged whether the judgment target node is abnormal or not. Accordingly, the abnormality of the judgment target node cannot be judged with high precision. Furthermore, it cannot be recognized that reset occurs in the judgment target node itself when power supply to the judgment target node is interrupted, so that the abnormality cannot be judged with high precision.

For example, shock of a vehicle body, sudden engine stall or the like due to combustion failure of the engine under running may be caused not only by failure or deterioration of an engine constituting part such as a fuel system, an ignition system or the like, or failure or deterioration of an actuator or a sensor used to control ECU, but also by abnormality of a wire harness connected to ECU. Furthermore, these symptoms may also occur even when CPU operation of ECU fails or the power supply line is temporarily interrupted. In the instantaneous symptoms based on the temporary factor of ECU as described above, particularly the ECU reset during the idling state causes engine stall because fuel injection or ignition output is interrupted until the reset is restored. In such a case, a driver has a sense of mistrust and thus makes a claim.

Furthermore, the failure judgment is not settled in most cases because the symptoms are temporary. Therefore, it is difficult to store freeze frame data, operation status, etc. and it is not easy to specify a failure place in most cases.

SUMMARY OF THE INVENTION

The present invention has been implemented in view of the foregoing situation, and has an object to provide a network system in which abnormality of a self node is judged with high precision on the basis of information from other nodes connected to a network.

In order to attain the above object, according to the present invention, in a network system including a network and plural nodes connected to a network so that data frames are transmitted/received among the nodes, each of the nodes includes: a start-up signal transmitting unit for transmitting a start-up signal on the basis of an initial data frame after the node is reset and restored; a reception error count unit for counting, every a communication partner node, a frequency at which reception of data frames to be communicated (transmitted/received) among the nodes cannot be performed; a monitoring result returning unit for returning a count result of a transmission destination node of a start-up signal of the reception error count unit to the transmission destination node of the start-up signal when the start-up signal is received from some node; and a self-diagnosing unit for making self-diagnosis on the basis of the count result of the reception error count unit which is returned from another node for the start-up signal transmitted form the start-up signal transmitting unit. The self-diagnosing unit judges that the self node is abnormal when the count result of the reception error unit which is returned from plural other nodes is not less than a predetermined value.

According to the network system of the present invention, the self-diagnosing unit judges that the self node is abnormal when the count result of the reception error count unit which is returned from the plural other nodes is not less than the predetermined value, so that the self-diagnosing unit can specify a source of failure causing the operation failure of the node by a mutual monitoring work among the nodes and thus a failure site can be easily analyzed.

The foregoing and other objects, features, aspects and advantages of the present invention will become more apparent from the following detailed description of the present invention when taken in conjunction with the accompanying drawings.

DETAILED DESCRIPTION OF THE INVENTION

First Embodiment

A first embodiment according to the present invention will be described with reference to the accompanying drawings.

Figure 1:
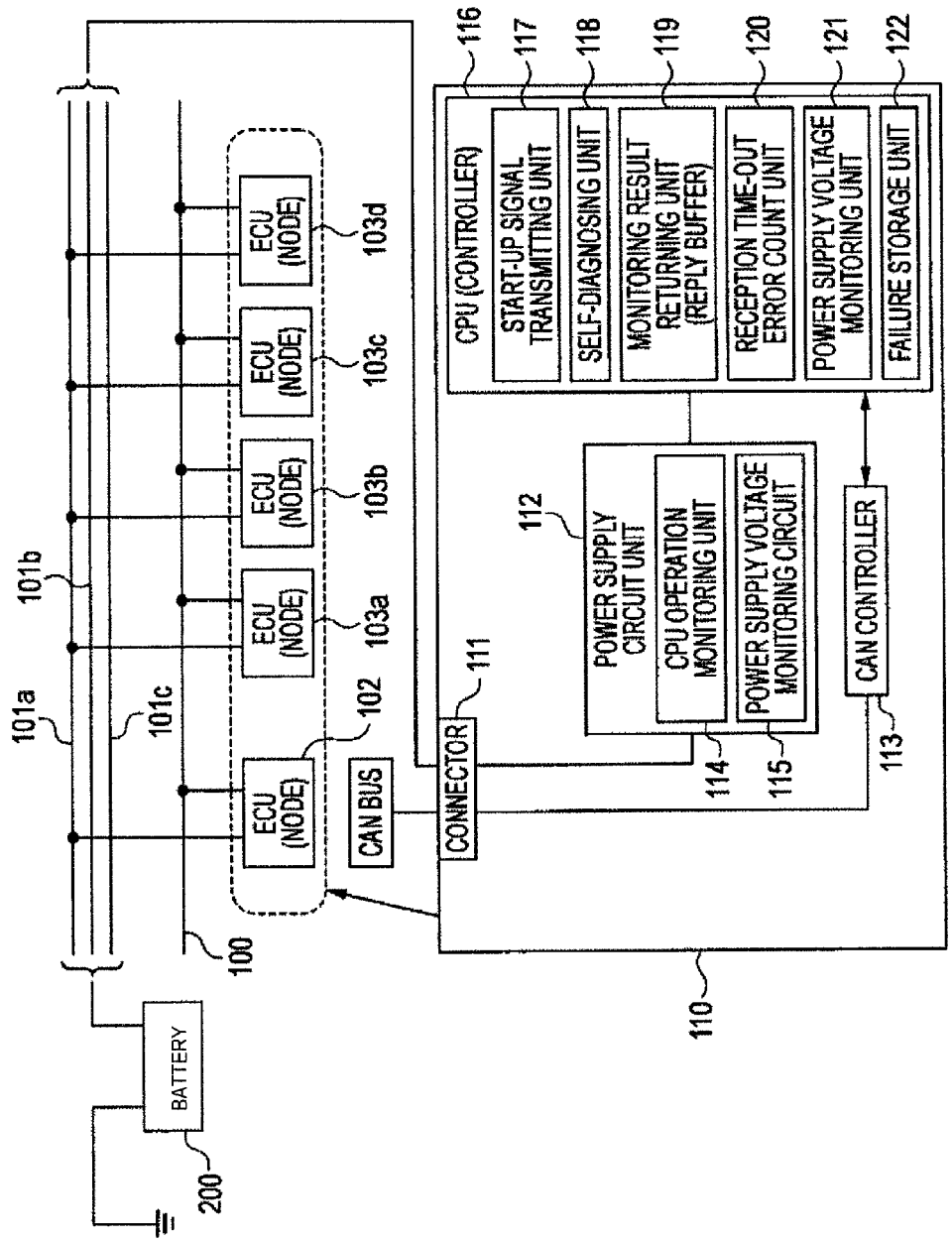
FIG. 1 is a diagram showing a system construction of a vehicle network system according to a first embodiment of the present invention.

FIG. 1 is a diagram showing the system construction of a vehicle network system according to a first embodiment of the present invention.

In FIG. 1, plural ECUs (nodes) 102, 103a, 103b, 103c, 103d (controllers) are connected to a CAN bus 100 of a vehicle network, and data are communicated (transmitted/received) among ECUs 102 to 103d according to a predetermined communication protocol.

It is general that the vehicle network is constructed by plural networks different in the attribute of the communication speed such as a network of a power train system for controlling an engine and a transmission, a network of a body control system, etc. However, in the present invention, the same ECU operation monitoring means can be applied in the respective networks, and thus the description of FIG. 1 will be made by exemplifying a CAN bus system for power train control. FIG. 1 shows the system construction of a CAN bus system for a power train control of a vehicle, and an engine ECU for controlling the engine, ECU for controlling the transmission, ECU for controlling ABS (anti-lock braking system), etc. are connected to the CAN bus.

At the time of remedies or check-out in a service factory or the like, a diagnosis tester that can communicate with ECU is connected to the ECUs 102 to 103d, and breakdown information and operation information of each part of the vehicle can be read out and supplied for remedies or check-out.

ECU power supply lines 101a, 101b and 101c are supplied with 12V of an in-vehicle mount battery 200 as a power supply source, and each ECU is supplied with power through a fuse, a relay or the like. The branch places of wire harnesses are divided into plural systems.

ECU 110 represents the internal construction of each of ECUs 102 to 103d, and it is supplied with power and communicates with CAN bus through a connector 111. ECU 110 is equipped with a power supply unit 112 serving as a power supply source for each part in ECU, a CAN controller 113 for transmitting/receiving to/from the CAN bus 100 and CPU 116.

The power supply circuit unit 112 monitors a watchdog timer signal of CPU 116, a CPU operation monitoring unit 114 that can reset CPU 116 when abnormality occurs, and a power supply voltage monitoring circuit 115 for making CPU 116 monitor a supplied power supply voltage.

In order to perform self-diagnosis and monitor the operation of other ECUs, CPU 116 is equipped with a start-up signal transmitting unit 117 for transmitting a start-up signal to the CAN bus 100 after restoration of reset by an initial data frame to request a reply, a self-diagnosing unit 118 for self-diagnosing occurrence or non-occurrence of abnormality on the basis of reply data (return data), a monitoring result returning unit 119 for returning a monitoring result when receiving a start-up signal from a self-diagnosis target ECU, a reception time-out error count unit 120 (reception error count unit) for counting, every communication partner node, a frequency at which no data frame can be received, a power supply voltage monitoring unit 121 for monitoring whether a power supply voltage instantaneously varied, and a failure storage unit 122 for storing a diagnosis code when abnormality is judged on the basis of self-diagnosis.

Figure 2:
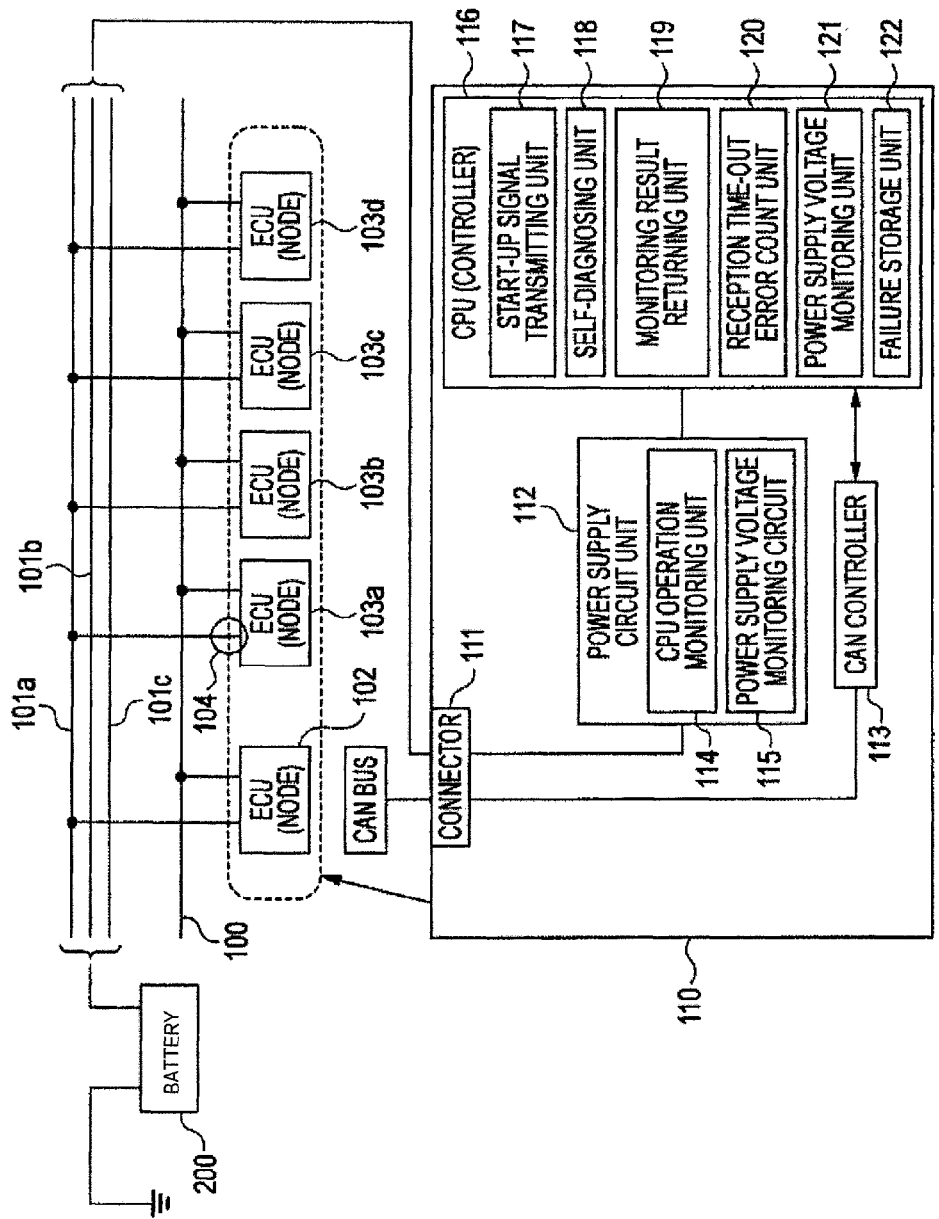
FIG. 2 is a diagram showing a monitoring method of the vehicle network system according to the first embodiment of the present invention.

FIG. 2 is a diagram showing a monitoring method of the vehicle network system according to the first embodiment of the present invention.

In FIG. 2, the parts 100, 101a to 101c, 102, 103a to 103d, 110 to 122 and 200 are identical to those in FIG. 1. At the connector portion of ECU 103a, a terminal portion 104 of the power supply line of ECU 103a corresponds to an interruption place of power supply.

Figure 3:
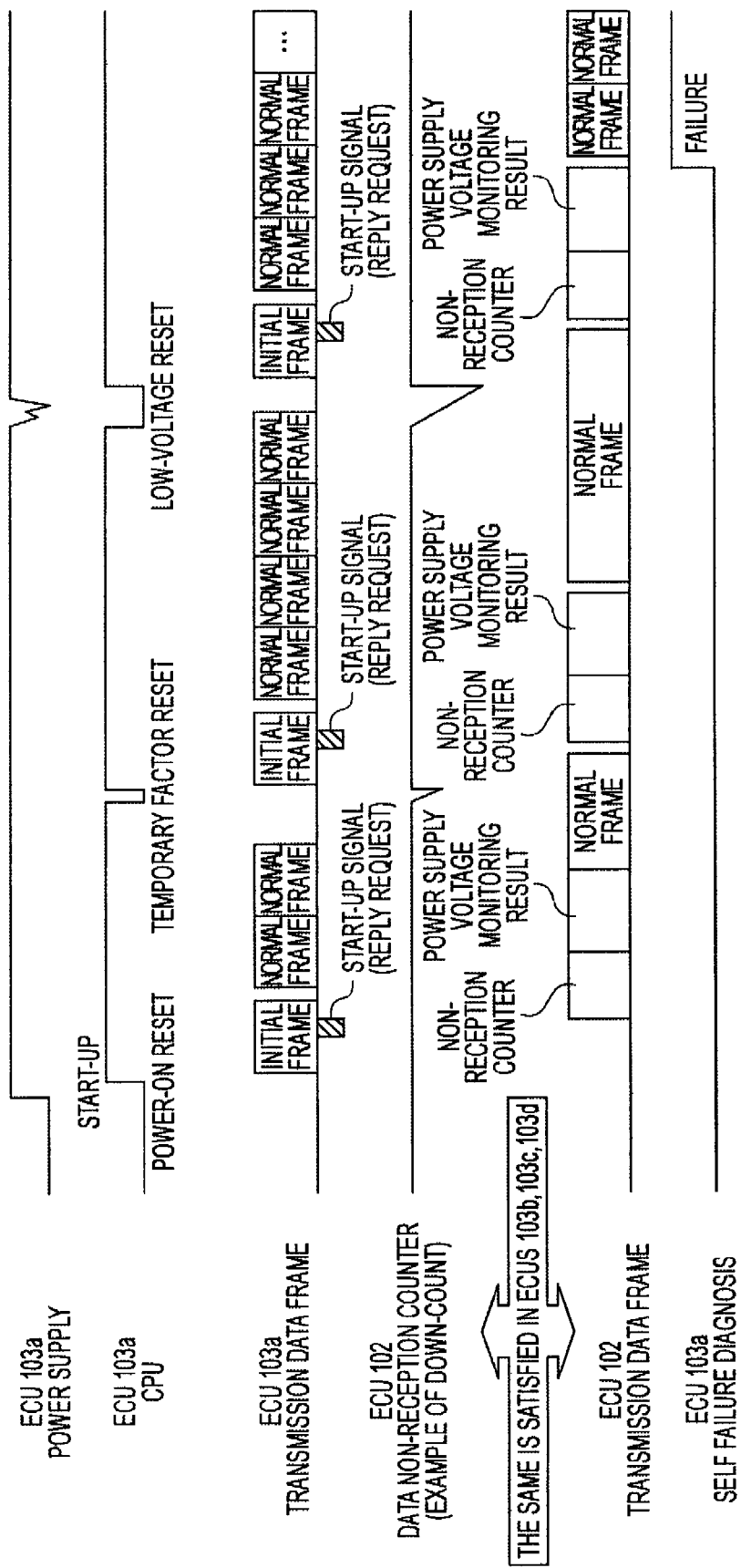
FIG. 3 is a first timing diagram showing the monitoring method of the vehicle network system according to the first embodiment of the present invention.

FIG. 3 is a first timing diagram showing the monitoring method of the vehicle network system according to the first embodiment of the present invention. FIG. 3 shows transmission data frames of ECU 103a and ECU 102 and self failure diagnosis of ECU 103a in the case of power-on reset, temporary factor reset, low-voltage reset.

Figure 4:
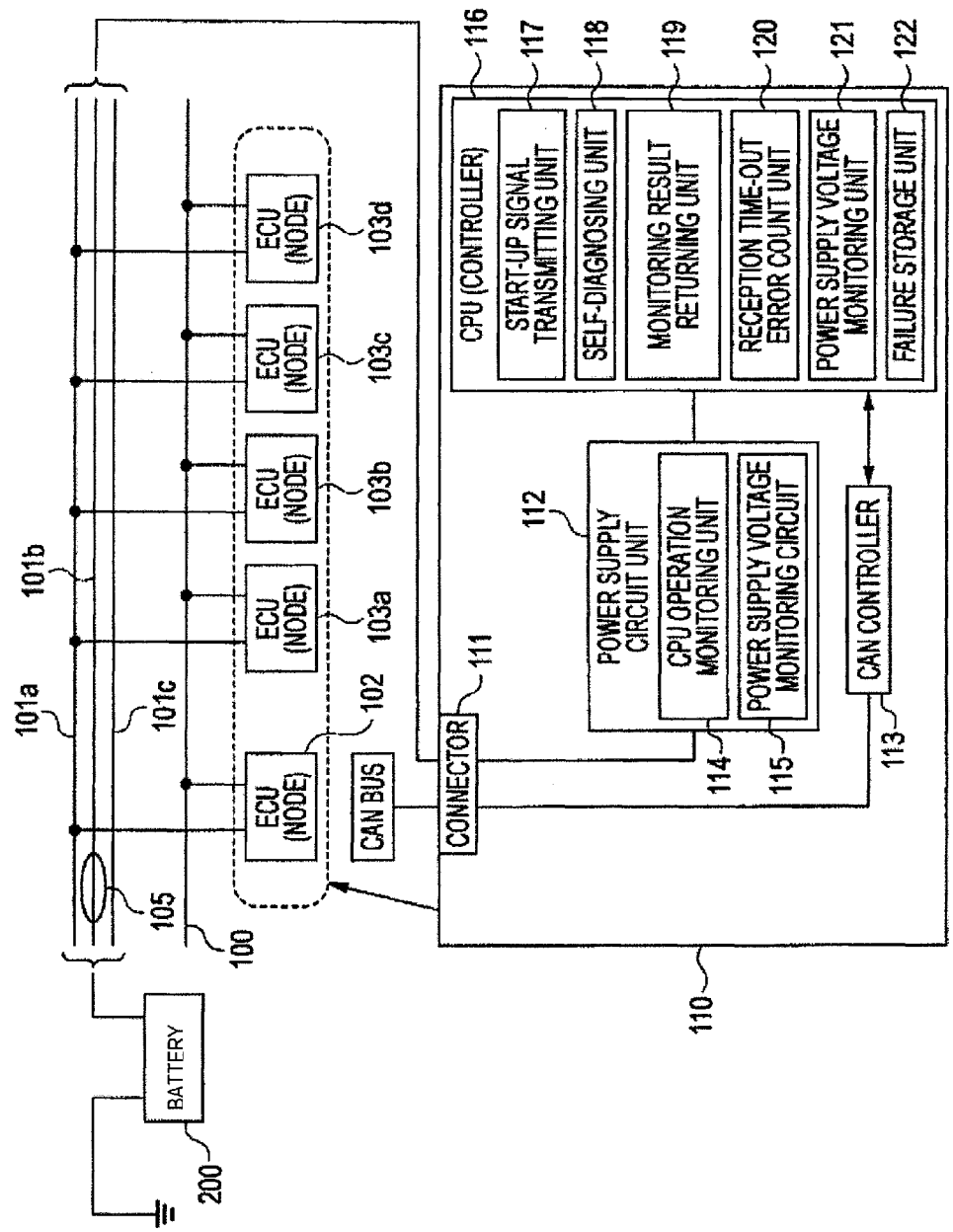
FIG. 4 is another diagram showing the monitoring method of the vehicle network system according to the first embodiment.

FIG. 4 is another diagram showing the monitoring method of the vehicle network system according to the first embodiment of the present invention.

In FIG. 4, the parts 100, 101a to 101c, 102, 103a to 103d, 110 to 122, 200 are identical to those in FIG. 1. An interruption place 105 of power supply occurs in the power supply line 101b.

Figure 5:
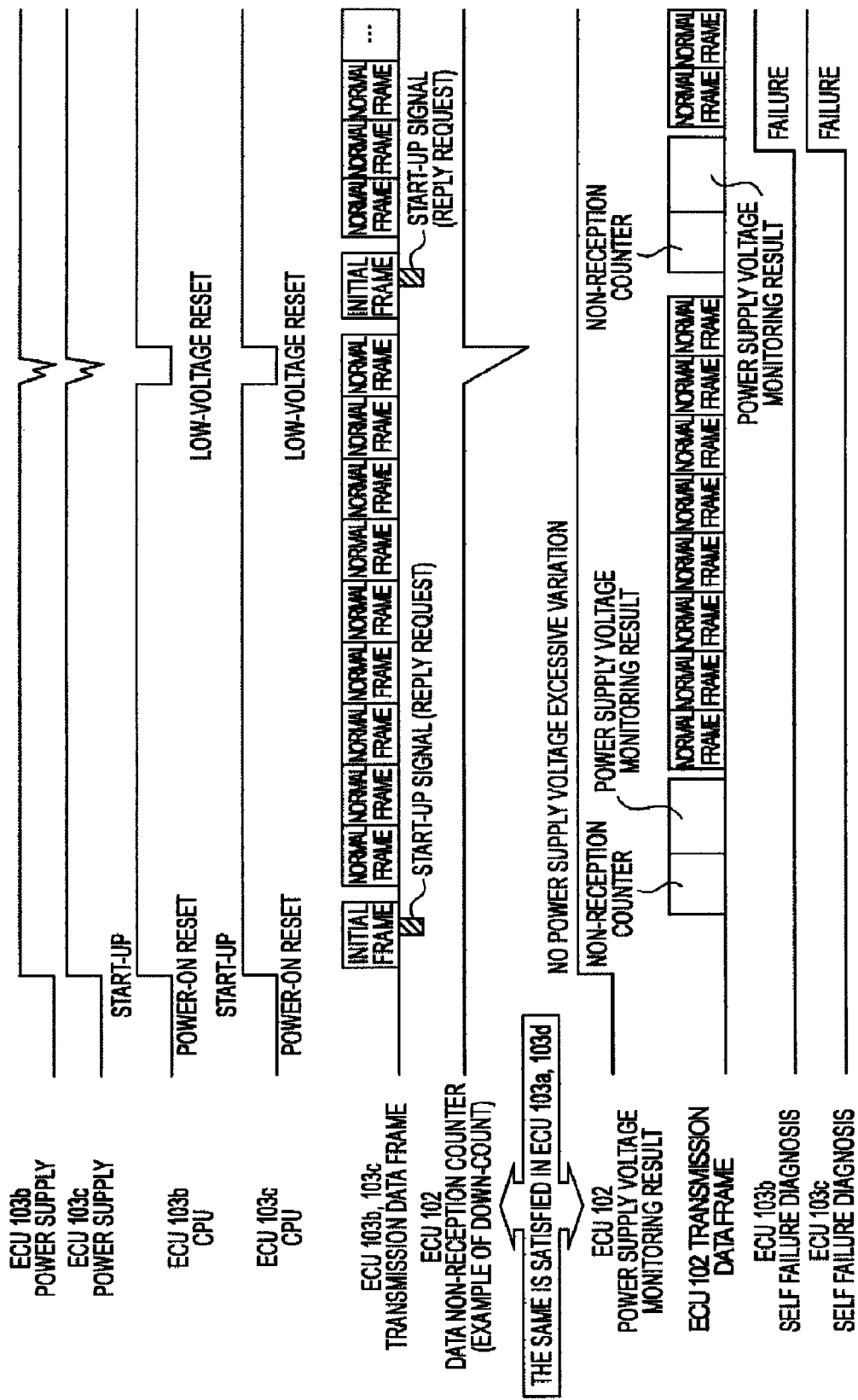
FIG. 5 is a second timing diagram showing the monitoring method of the vehicle network system according to the first embodiment of the present invention.

FIG. 5 is a second timing diagram showing the monitoring method of the vehicle network system according to the first embodiment 1 of the present invention. FIG. 5 shows transmission data frames of ECUs 103b, 103c and ECU 102 and self failure diagnosis of ECUs 103a and 103b in the case of power-on reset, low-voltage reset.

Figure 6:
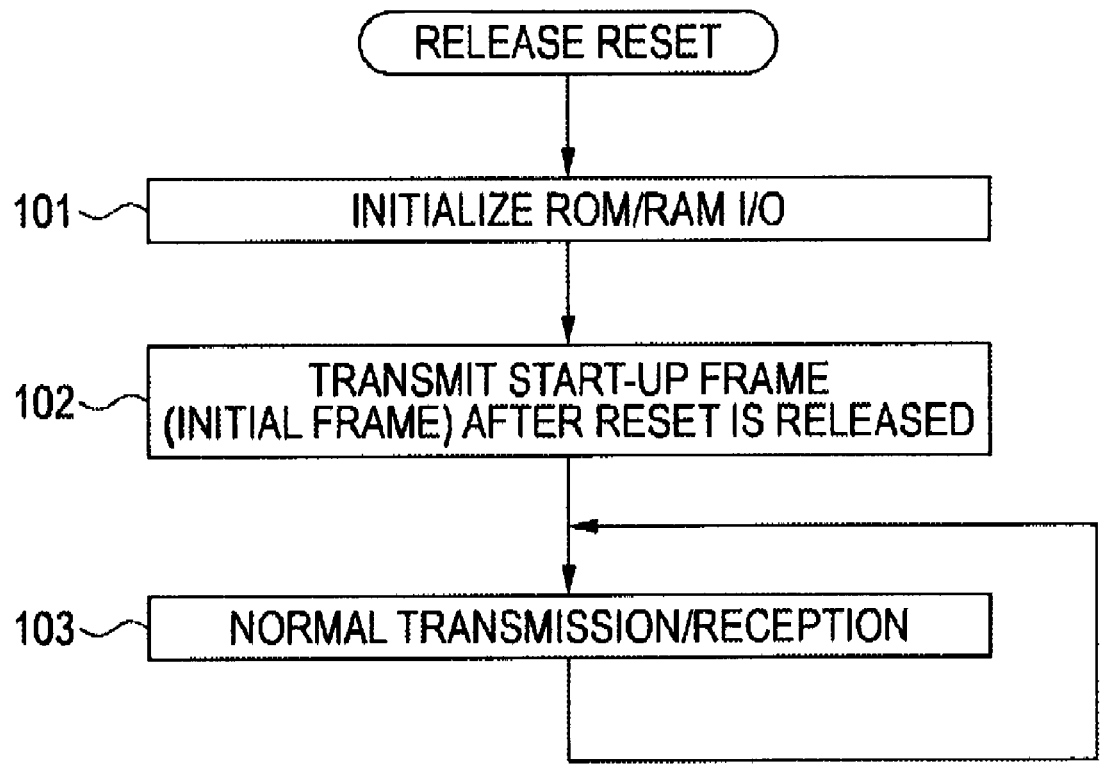
FIG. 6 is a flowchart showing the operation after reset of a self-diagnosis target ECU is released in the vehicle network system according to the first embodiment of the present invention.

FIG. 6 is a flowchart showing the operation after release of the reset of the self-diagnosis target ECU in the vehicle network system according to the first embodiment of the present invention.

Figure 7:
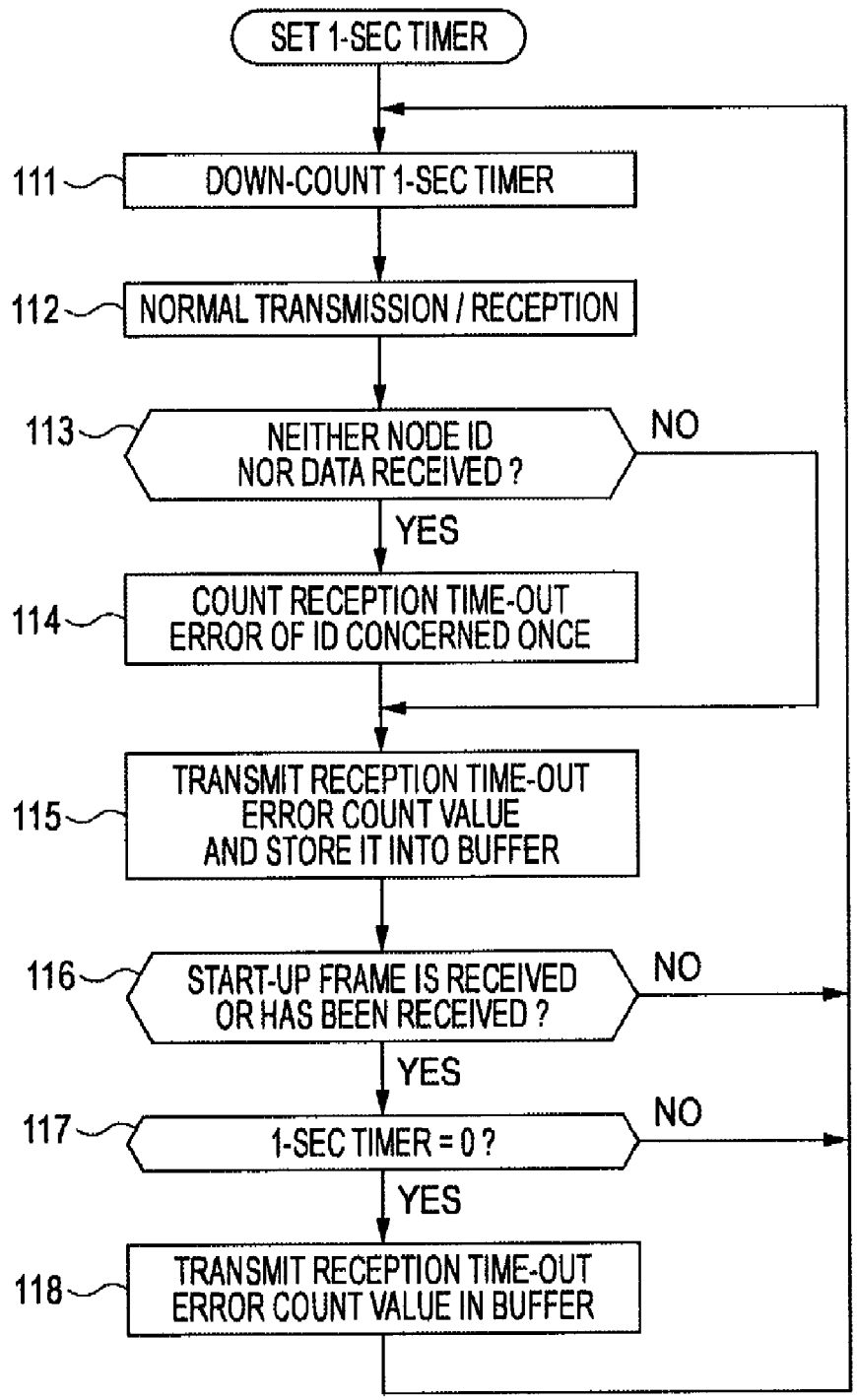
FIG. 7 is a flowchart showing the operation of a reception time-out error count unit of ECU in the vehicle network system according to the first embodiment of the present invention.

FIG. 7 is a first flowchart showing the operation of the reception time-out error counter unit of ECU in the vehicle network system according to the first embodiment of the present invention.

Figure 8:
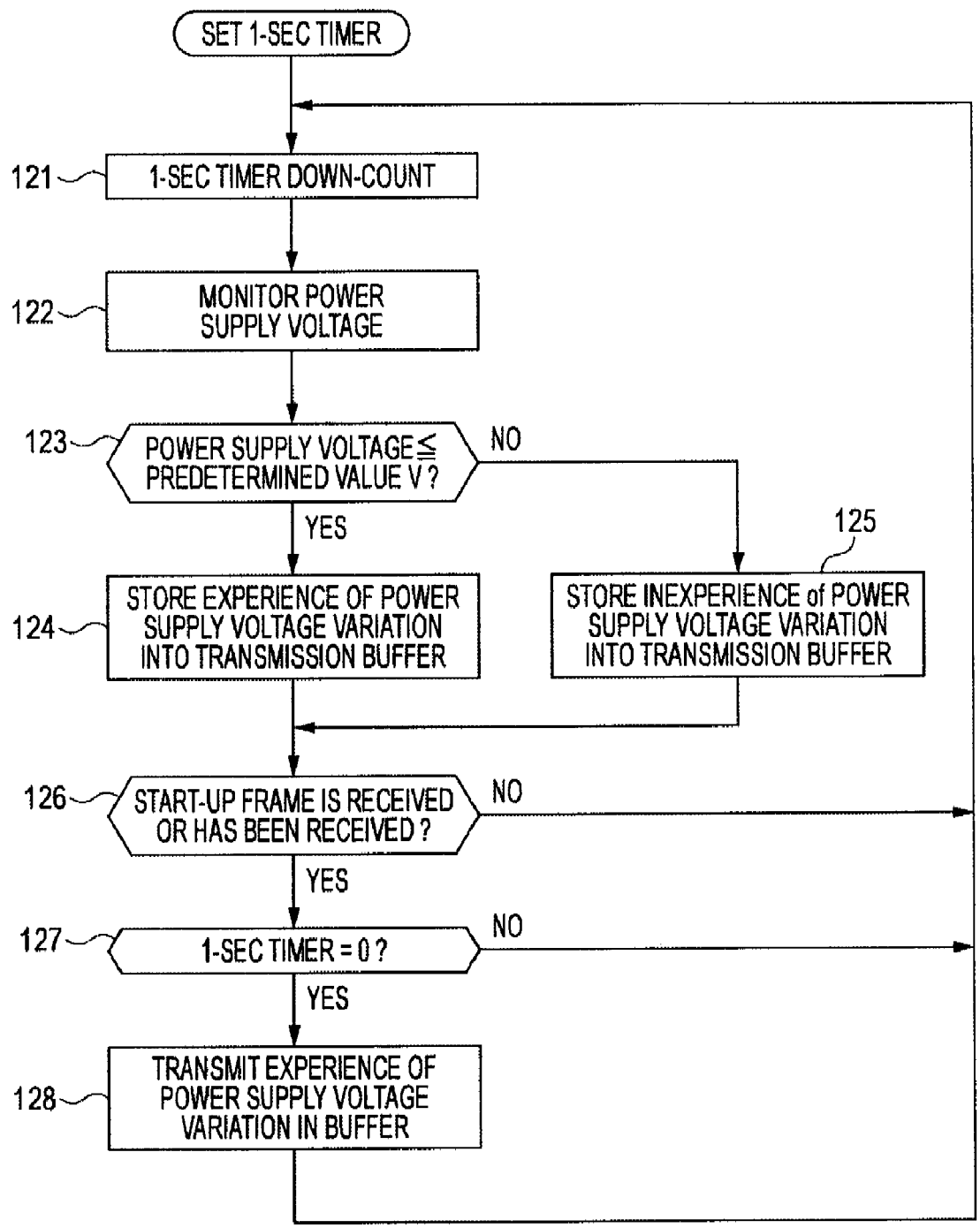
FIG. 8 is a flowchart showing the operation of a power supply voltage monitoring unit of ECU in the vehicle network system according to the first embodiment of the present invention.

FIG. 8 is a flowchart showing the operation of a power supply voltage monitoring unit of ECU in the vehicle network system according to the first embodiment of the present invention.

Figure 9:
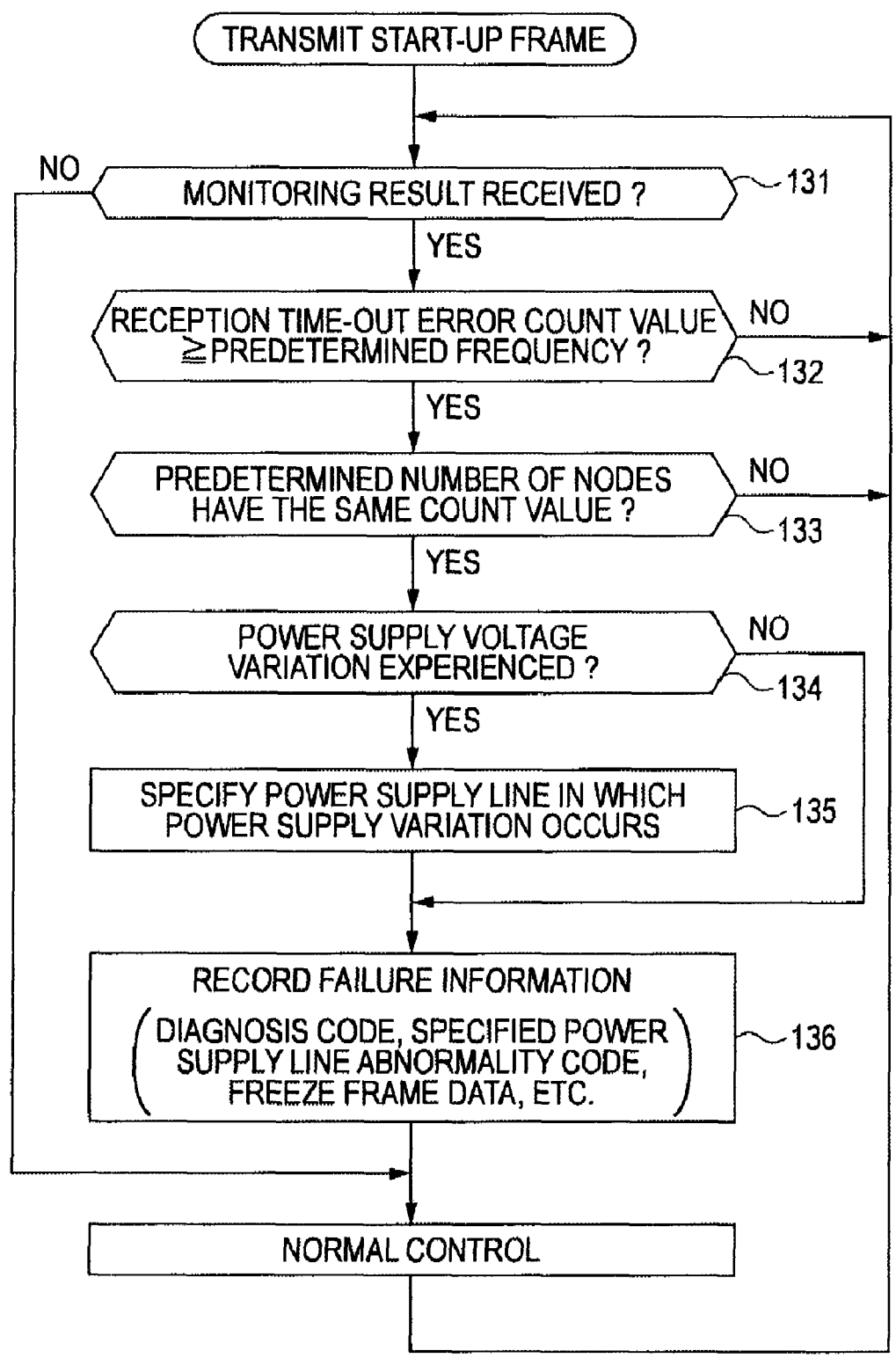
FIG. 9 is a flowchart showing a self-diagnosis operation of ECU in the vehicle network system according to the first embodiment of the present invention.

FIG. 9 is a flowchart showing the self-diagnosing operation of ECU in the vehicle network system according to the first embodiment of the present invention.

Next, the operation will be described.

First, the operation when general ECU operates normally will be described with reference to FIG. 1.

When a driver turns on an ignition switch, power is supplied from the power supply lines 101a to 101c to ECU 102 to 103d. In each ECU, when power is supplied to each part in ECU 110 by the power supply circuit unit 112, CPU 116 is started up by arising a reset signal of CPU. When CPU 116 is started up, necessary communication information is transmitted or received among ECUs 102 to 103d from the CAN controller 113 through the CAN bus 100 according to a predetermined communication protocol.

Next, a case where ECU is instantaneously reset due to some temporary factor during operation of ECU will be described with reference to FIG. 2.

For example, when ECU 103a is instantaneously reset due to some temporary factor, transmission information from ECU 103a to the CAN bus 100 is temporarily interrupted, and the interruption of the transmission information is continued until ECU 103a is restored from the reset, CPU 116 is re-started up and data frame transmission to the CAN bus 100 is resumed. ECUs 102, 103b, 103c, 103d connected to the CAN bus 100 cannot receive the data frame from ECU 103a and thus counts a reception error frequency.

In the case of a general reception time-out error judgment, if the above counting operation is continued for a predetermined time or the reception error frequency reaches a predetermined frequency, it is settled as the reception time-out error. However, in the case of an instantaneous reception error, the count operation is not continued for a predetermined time or the reception error frequency does not reach a predetermined frequency. However, in ECUs 102, 103b, 103c, 103d excluding ECU 103a, the reception error frequency of the data frame concerned is counted in the same manner, and thus the count values thereof are not relatively greatly different from one another and they are substantially equal to the same level value.

That is, ECU 103a is restored from the reset and transmits a start-up signal as a reply request to the other nodes, and ECUs 102, 103b, 103c, 103d receiving this start-up signal returns the reception error count numbers of the data frame concerned to ECU 103a. In this case, when in the self-diagnosis of ECU 103a, the reception error count numbers from the plural ECUs are relatively compared with one another and the same count number is obtained, ECU 103a can recognize that the device thereof is under abnormal operation.

Next, a case where power of ECU is instantaneously interrupted due to contact failure of a connector or abnormality of a wire harness during operation of ECU will be described with reference to FIG. 2.

For example, the same is true in a case where the power is instantaneously interrupted at the terminal portion 104 of the power supply line at the connector portion 111 of ECU 103a. When the power of the ECU 103a is interrupted, the operation of CPU 116 of ECU 103a is stopped and reset, so that transmission information to the CAN bus 100 is interrupted. This interruption is continued until the power supply to ECU 103a is restored, CPU 116 is re-started up and transmission of data frames to the CAN bus 100 is resumed. In this case, ECUs 102, 103b, 103c, 103d connected to the same CAN bus 100 cannot receive any data frame from ECU 103a and thus count a reception error frequency.

In ECUs 102, 103b, 103c, 103d excluding ECU 103a, the reception error frequency of the data frame concerned is counted in the same manner, and even when the power supply to ECU 103a is instantaneously interrupted, the count values of ECUs 102, 103b, 103c, 103d are not so relatively greatly different from one another, and are equal to substantially the same value. In this case, the power supply of ECUs 102, 103b, 103c, 103d excluding ECU 103a is not interrupted, and thus they do not exhibit any abnormality in the monitoring of the power supply voltage.

In this case, on the basis of the self-diagnosis of the same means as described above, ECU 103a can recognize that it is under operational abnormality.

As shown in FIG. 3, so-called power-on reset at the time when power is turned on, instantaneous reset caused by some temporary factor of ECU 103a and low-voltage reset when the power of ECU is instantaneously interrupted are considered with respect to a case where ECU is instantaneously reset due to some temporary factor during operation of ECU or a case where the power supply to ECU is instantaneously interrupted due to contact failure of the connector, abnormality of the wire hardness or the like. An initial frame containing a start-up signal as a reply request to other nodes is transmitted after restored from each reset.

For example, when instantaneous reset occurs due to some temporary factor in ECU 103a, ECUs 102, ECU 103b, 103c, 103d serving as the other nodes monitoring ECU 103a cannot receive any transmission data frame from ECU 103a, and thus they count the data non-reception counter. When receiving the above-described start-up signal from ECU 103a, they return their data non-reception count results and their monitoring results of the power supply voltage within a predetermined period to ECU 103a, and ECU 103a executes the self failure diagnosis on the basis of the return results from the other nodes. The same operation is executed when the low-voltage reset occurs in the case where the power of ECU 103a is instantaneously interrupted.

Furthermore, a case where the power supply line 101b is instantaneously interrupted at an interruption place 105 under the state that the communication based on the vehicle network is normally executed among ECUs will be described with reference to FIG. 4.

For example, when the power is instantaneously interrupted at the interruption place 105 of one power supply line 101b of the in-vehicle mount battery 200, the power supply to ECUs 103b, 103c is interrupted. When the power supply to ECUs 103b, 103c is interrupted, ECUs 102, 103a, 103d count the reception error frequency of the data frame of ECUs 103b, 103c in a similar manner. At this time, the power supply to ECUs 102, 103a, 103d is not interrupted, and thus they do not exhibit any abnormality in the monitoring of the power supply voltage.

That is, each of ECUs 102, 103a, 103d returns the reception error count number (frequency) of the data frame of ECUs 103b, 103c and also the fact that there is no abnormality in its own power supply voltage, whereby ECUs 103*b*, 103*c* can recognize that the cause (factor) of the operational abnormality is the interruption of the power supply voltage.

Furthermore, when the power supply line shared by plural ECUs is instantaneously interrupted under the state that the communication based on the vehicle network is normally executed among ECUs, the low-voltage reset occurs in ECU 103*b* and ECU 103*c* as shown in FIG. 5, and an initial frame containing a start-up signal as a reply request to the other nodes is transmitted after restored from the reset.

There is no abnormality in power supply to ECUs 102, 103*a*, 103*d* which are connected to the power supply lines different from that of ECUs 103*b*, 103*c* and operate normally, and they cannot receive the transmission data frame from ECU 103*b*, ECU 103*c*. Therefore, they count the data non-reception counters, and when receiving the start-up signal described above from ECU 103*b*, ECU 103*d*, each of the ECUs 102, 103*a*, 103*d* returns the data non-reception count result and the monitoring result of the power supply voltage within the predetermined period thereof. ECUs 103*b*, ECU 103*c* execute the self failure diagnosis on the basis of the return results from the other nodes.

Next, the diagnosing function possessed by each ECU (node) connected to the CAN bus 100 of the vehicle network will be described with reference to the flowchart of FIG. 6.

FIG. 6 is a diagram showing an operation procedure which is commonly set to respective ECUs 102 to 103*d*, and it is the process flow when each ECU is reset for some cause (factor) and then the reset is released.

First, ROM/RAM is initialized and I/O is initialized (step 101).

After the reset is released, a data frame representing initial transmission (hereinafter referred to as "start-up frame") is transmitted (step 102). Thereafter, the processing shifts to normal communication (step 103).

Next, the operation of a monitoring result returning unit and a reception time-out error count unit of another node which monitors the start-up frame from ECU after reset and returns a monitoring result will be described with reference to the flowchart of FIG. 7.

FIG. 7 shows the operation procedure which is commonly set to respective ECUs 102 to 103*d*. It is the processing flow when the start-up frame is received from the self-diagnosis target ECU, and mainly represents the flow of the reception time-out error count unit.

First, after CPU is started up, a predetermined time timer (one second is set as an example in FIG. 7) is set, and the down-count of the timer is started (step 111). Thereafter, the processing shifts to normal transmission/reception (step 112). This predetermined time timer is used to calculate how many times a reception time-out error count value is counted within a fixed period.

It is judged whether a prescribed ID (node ID) or data can be normally received in the transmission/reception of the data frame according to a predetermined communication protocol (step 113), and when it can be normally received, the reception time-out error count value is stored in a transmission buffer (step 115). When it cannot be normally received, the reception time-out error counter of the ID concerned is counted once (step 114). In this case, the count value is also stored in the transmission buffer (step 115).

Subsequently, it is judged whether the start-up frame after the reset of the self-diagnosis target ECU described above is received or not, or whether it has been already received (step 116), and if the start-up frame is not received, the processing returns to the down-count processing of a 1-sec timer (step 111). When the start-up frame is received or has been already received, it is judged whether the 1-sec timer is equal to zero or not (step 117). If the 1-sec timer is not equal to zero, the processing returns to the down-count processing of the 1-sec timer (step 111). Conversely, if the 1-sec timer is equal to zero after the start-up frame is received, the reception time-out error count value stored in the transmission buffer is transmitted (step 118).

Next, the operation of the monitoring result returning unit for monitoring the start-up frame after reset and returning the monitoring result and the power supply voltage monitoring unit will be described with reference to the flowchart of FIG. 8.

FIG. 8 shows the operation procedure which is set in respective ECUs 102 to 103*d*. It is the processing flow when the start-up frame from the self-diagnosis target ECU is received, and mainly shows the flow of the power supply voltage monitoring unit.

First, a predetermined time timer (which is set to 1 sec as an example in FIG. 8 as in the case of FIG. 7) is set after CPU is started up, and the down-count of the timer is started (step 121). This predetermined time timer is used to check whether a power supply voltage variation described later is experienced within a fixed period.

The power supply voltage is designed so that the voltage value supplied to ECU can be monitored at all times by utilizing an A/D converter which is equipped to CPU as standard equipment or an element for outputting a signal when the voltage is reduced to a reference voltage or less (step 122), and it is judged whether the power supply voltage is equal to a voltage which is not more than a predetermined value V (step 123). If the voltage is not equal to the predetermined value or less, information representing that the power supply voltage variation has not been experienced is stored in the transmission buffer (step 125). When the power supply voltage is reduced to the predetermined value or less, information representing that the power supply voltage variation is experienced is stored in the transmission buffer (step 124).

Subsequently, it is judged whether the start-up frame after the reset of the self-diagnosis target ECU is received or has been already received (step 126). If the start-up frame is not received, the processing returns to the down-count processing of the 1-sec timer (step 121). If the start-up frame is received or has been already received, it is judged whether the 1-sec timer is equal to zero or not (step 127). If the 1-sec timer is not equal to zero, the processing returns to the down-count processing of the 1-sec timer (step 121). Conversely, if the 1-sec timer is equal to zero after the start-up frame is received, information representing experience or inexperience of the power supply voltage variation stored in the transmission buffer is transmitted (step 128).

Next, the operation of the self-diagnosing unit for transmitting the start-up frame after the self-diagnosis target ECU is restored from the reset and receiving the monitoring results returned from the other ECUs on the same CAN bus to make a diagnosis, and the operation of the failure storage unit for storing failure information when the self-diagnosis result is judged to be abnormal will be described with reference to the flowchart of FIG. 9.

FIG. 9 shows the operation procedure which is commonly set to respective ECUs 102 to 103*d*, and shows the flow when the self-diagnosis target ECU receives the monitoring results and makes a self-diagnosis.

First, after transmitting the start-up frame, the monitoring result from each ECU is received (step 131). When the monitoring result is received, it is judged whether the reception time-out error count value in the returned data frame from each ECU is equal to or larger than a predetermined frequency (step 132). Here, with respect to the setting of the predetermined frequency, it is reasonable to set the set value to 2 or more or to 3 or more in consideration of the situation that there is an error count of the time-out. Thereafter, it is judged whether a predetermined number or more of nodes count a count value of a predetermined frequency or more (step 133). If the number of the nodes is equal to the predetermined number or more, the self-diagnosis target ECU can recognize that the other ECUs on the same CAN bus cannot receive the normal transmission data frame of the self-diagnosis target ECU.

Here, if No is judged in steps 132, 133, the processing returns to standby processing until the monitoring result of step 131 is received.

Furthermore, the experience or inexperience of the power supply voltage variation is judged (step 134). When ECU connected to a different power supply line counts the reception time-out error of each ECU connected to the same power supply line as the self-diagnosis target ECU (start-up frame transmitting ECU) although the ECU concerned has not experienced the power supply voltage variation, it can be recognized that the reset occurs due to at least the instantaneous interruption of power supply on the specified power supply line (step 135). When the power supply voltage is not experienced in step 134, the processing shifts to step 136.

When abnormality is judged as a result of the self-diagnosis, the failure information is stored (step 136), and the processing returns to the normal control. The failure information contains a diagnosis code, an indicated power supply line abnormality code, freeze frame data, etc.

The failure storage unit 122 of FIG. 1 may be constructed by a flash memory, RAM having a backup battery or the like, for example.

The self-diagnosis of ECU may be prohibited for a period when power supply variation occurs with high probability, for example, just after on/off switching of an ignition key or just after on/off switching of an accessory. That is, in this case, each ECU is designed so as to detect the on/off switching and prohibit the monitoring of the start-up frame, the count of the reception time-out error and the judgment of the experience of the power supply voltage variation for a predetermined time.

According to the first embodiment, in the vehicle network in which the nodes are connected to the communication line and the data frame is transmitted/received among the nodes according to the predetermined protocol, the start-up signal contained in an initial data frame from a node which is restored from abnormality is received by each node, each node returns a monitoring result to the node restored from reset and the node restored from the reset self-diagnoses occurrence or non-occurrence of operational abnormality on the basis of the returned data. Therefore, it can be specified through the mutual monitoring work among the nodes whether a temporary symptom such as vehicle body shock or sudden engine stall due to combustion failure of the engine during operation is caused by the operation failure of ECU or by temporary interruption of the power supply line, and the failure site can be easily analyzed.

Furthermore, it can be judged whether the power supply interruption occurs in only the target ECU or in another ECU, a place at which instantaneous interruption of power supply occurs can be specified, and this is stored as a diagnosis. Therefore, subsequent trouble analysis can be easily performed.

The present invention is also applicable to a failure diagnosis among nodes of a network other than the vehicle network system for vehicles.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A network system comprising:
    a network; and
    a plurality of nodes connected to the network to transmit/receive data frames,
    wherein each of the plurality of nodes comprises:
        a start-up signal transmitting unit which transmits a start-up signal on the basis of an initial data frame after a respective node is reset and restored;
        a reception error count unit which counts, from every communication partner node, a reception error frequency, which is measurement indicating periods during which data frames could not be received from respective communication partner nodes;
        a monitoring result returning unit which, when a start-up signal is received from another node, returns a count result to said respective node indicating the reception error frequency of said respective node; and
        a self-diagnosing unit which makes a self-diagnosis based on the count result which is returned from other nodes, and
    wherein the self-diagnosing unit of the respective node judges that the respective node is abnormal by comparing the count result obtained from the other nodes to a threshold.

2. The network system according to claim 1, wherein each of the nodes has a power supply voltage monitoring unit which monitors whether there is an instantaneous variation in a power supply voltage, and when receiving the start-up signal from one of the other nodes, the monitoring result returning unit returns a monitoring result of the power supply voltage monitoring unit to a transmission destination node of the start-up signal.

3. The network system according to claim 2, wherein each of the nodes has a failure storage unit which stores diagnosis information when the node is judged to be abnormal by the self-diagnosing unit.

4. The network system according to claim 1, wherein each of the nodes has a failure storage unit which stores diagnosis information when the node is judged to be abnormal by the self-diagnosing unit.

5. The network according to claim 1, wherein each of the plurality of nodes is a electronic control unit in a vehicle.

6. The network according to claim 1, wherein the network is controlled area network.

7. A method of detecting abnormality in one of a plurality of nodes that are connected in a network and exchange data frames, the method comprises:
    resetting a node from the plurality of nodes;
    transmitting by the node a start-up signal based on transmission of an initial data frame after said resetting;
    counting by other nodes from the plurality of nodes, duration in which the node cannot transmit/receive said data frames;
    after the start-up signal is received by the other nodes, each of the other nodes returns a result from said counting to the node; and
    determining an abnormality by the node based on the result from each of the other nodes, wherein said determining comprises analyzing each result from the other nodes and comparing said each result to a threshold value.

8. The method of claim 7, wherein the determining comprises determining type of the abnormality.

9. The method of claim 8, wherein the type of abnormality is one of a failure of the node, a temporary interruption of power, and a failure of a power line.

10. The method of claim 7, wherein said analyzing comprises comparing each of the result with each other and detecting a place of error.

11. The method of claim 7, wherein the plurality of nodes are electrical control units in a vehicle and the network is a controlled area network in which the plurality of nodes are connected to each other via at least one data bus.

12. A node which self-detects abnormalities and which exchanges data frames with a plurality of other nodes via a network, the node comprising:

a start-up signal transmitting unit, which transmits a start-up signal to the plurality of other nodes after a reset; and a self-diagnosing unit which determines whether an abnormality was present based on count results received from at least two of the plurality of other nodes, wherein the count results comprise individual results from each of the at least two of the plurality of other nodes, said individual results indicating the amount of data frames that were not received prior to the start-up signal by a respective node from the at least two of the plurality of other nodes.

* * * * *